Dec. 15, 1925.
A. A. GORDON
1,565,639
CLUTCH
Filed May 31, 1924
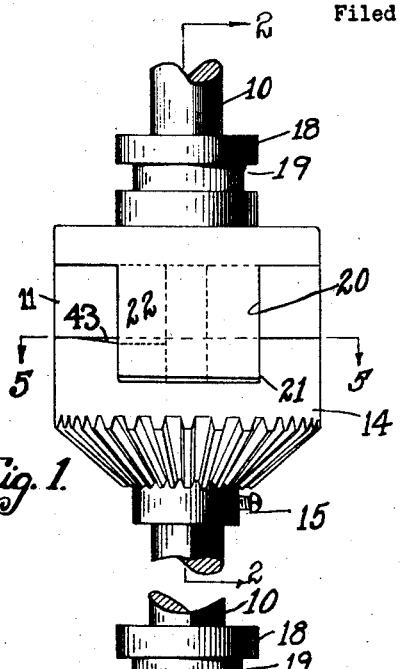
Fig. 1.
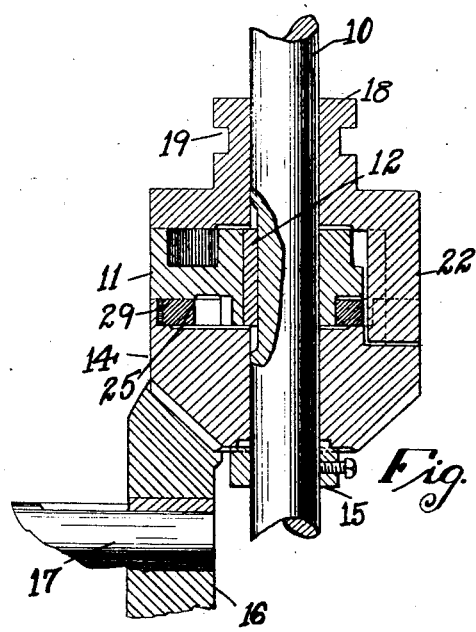
Fig. 2.
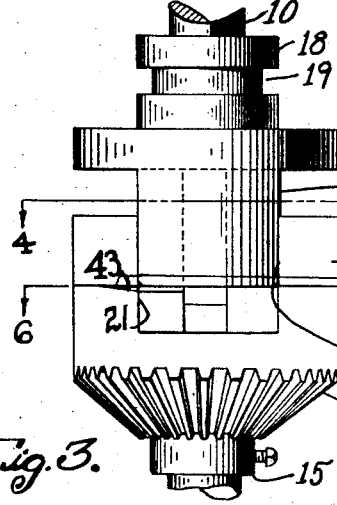
Fig. 3.
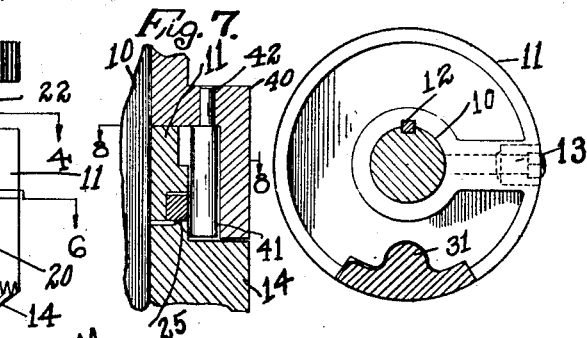
Fig. 7.
Fig. 4.
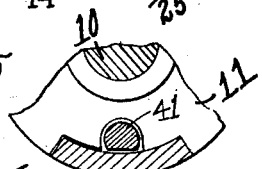
Fig. 8.
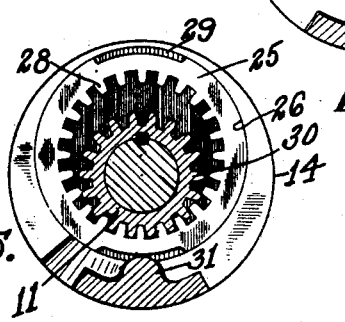
Fig. 5.
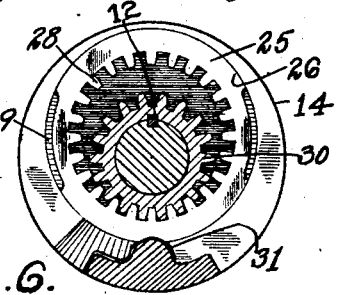
Fig. 6.
INVENTOR
A. A. GORDON.
ATTORNEYS Patented Dec. 15, 1925.

1,565,639

UNITED STATES PATENT OFFICE.

ALBERT A. GORDON, OF WORCESTER, MASSACHUSETTS, ASSIGNOR TO CROMPTON & KNOWLES LOOM WORKS, OF WORCESTER, MASSACHUSETTS, A CORPORATION OF MASSACHUSETTS.

CLUTCH.

Application filed May 31, 1924. Serial No. 716,855.

*To all whom it may concern:*

Be it known that I, ALBERT A. GORDON, a citizen of the United States, residing at Worcester, in the county of Worcester and State of Massachusetts, have invented a new and useful Clutch, of which the following is a specification.

This invention relates to a clutch particularly designed for use on the vertical driving shaft which actuates the pattern and box chains in drop box looms of the worsted type.

My improved clutch is, however, capable of general application and is not limited in its utility to use in a particular type of machine.

It is the object of my invention to provide an improved clutch for such purposes which may be placed in driving engagement only at predetermined angular relations of the parts. As herein shown, the clutch can be engaged at one point only in every two revolutions of the parts.

With this general object in view, an important feature of my invention relates to the provision of an integral driving projection or lug co-operating with peripheral recesses in the driving and driven members to engage these parts and also to improved devices for controlling the movement of the driving projection.

My invention further relates to arrangements and combinations of parts which will be hereinafter described and more particularly pointed out in the appended claims.

Two forms of the invention are shown in the drawings, in which—

Fig. 1 is a side elevation of my improved clutch, with the parts in driving engagement;

Fig. 2 is a longitudinal sectional elevation, taken along the line 2—2 in Fig. 1;

Fig. 3 is a view similar to Fig. 1 but showing the parts in separated relation;

Fig. 4 is a sectional plan view, taken along the line 4—4 in Fig. 3;

Fig. 5 is a sectional plan view, taken along the line 5—5 in Fig. 1;

Fig. 6 is a sectional plan view, taken along the line 6—6 in Fig. 3;

Fig. 7 is a fragmentary sectional view similar to a part of Fig. 2 but showing a modified form of projection and lug; and Fig. 8 is a section on line 8—8 of Fig. 7.

Referring to the drawings, I have shown a shaft 10 to be driven and a member 11 fixed thereon by a key 12 (Fig. 2) and set screw 13 (Fig. 4). A driving member 14 is rotatably mounted on the shaft 10 below the fixed member 11 and is prevented from axial movement along the shaft by a collar 15 secured to the shaft below the member 14. At its lower end, the member 14 is provided with bevel gear teeth meshing with a driving bevel gear 16 mounted on a shaft 17 and driven from any convenient source of power (not shown).

A third member 18 is slidable on the shaft 10 and is provided with a circumferential groove 19 adapted to receive a yoke (not shown) by which the member 18 may be manually moved axially of the shaft 10.

The fixed member 11 has a peripheral recess 20 at one point in its circumference and the driving member 14 has a similar recess 21 extending downward from the upper surface thereof. The sliding member 18 has an integral downwardly extending projection 22 fitting the recesses 20 and 21. When the projection 22 is moved downward and is received in the two recesses 20 and 21, it locks the driving member 14 to the fixed member 11 and thereby causes rotation of the shaft 10.

Special provision is made for determining the points in the relative rotation of the parts at which the projection 22 may be moved to thus engage the clutch. For this purpose, a ring 25 (Fig. 5) is seated in a recess 26 in the upper surface of the driving member 14. The ring 25 is provided with internal gear teeth 28 and also with two oppositely disposed notches or recesses 29 in the peripheral surface thereof. The lower end of the fixed member 11 is also provided with gear teeth 30 meshing with the internal gear teeth 28.

The driving projection 22 of the sliding member 18 is provided with an inner lug 31 (Figs. 4 and 6) which normally engages the upper surface of the ring 25, as shown in Fig. 6, and thus prevents downward movement of the projection 22 to engage the driving member 14. When, however, the lug 31 is aligned with one of the peripheral recesses 29 of the ring 25, the projection 22 is free to move downward and engage the clutch.

By selecting the number of external teeth 30 and internal teeth 28, this periodic alignment of the lug 31 and recesses 29 may be varied within wide limits. As shown in the drawing, the ring 25 has twenty-four internal teeth and the member 11 has eighteen external teeth. When the clutch is disengaged, the shaft 10 and fixed member 11 and the external teeth 30 will remain in fixed position, while the driving member 14 will continue to rotate and the ring 25 will have an eccentric movement about the axis of the shaft 10. With the gears proportioned as indicated, one revolution of the driving member 14 relative to the fixed member 11 will retard the ring 25 one fourth of a revolution, and two revolutions of the member 14 will retard the ring one half of a revolution so that the opposite recess 29 will then be aligned with the projection 22.

In Figs. 7 and 8 I have shown a modification wherein the sliding member has a projection 40, the inner and outer faces of which are preferably arcuate, as seen in Fig. 8. The lug 41 is formed separately from the projection and may be riveted to the sliding member as at 42 to occupy a position similar to lug 31. In this way I am enabled to use a steel lug which may be hardened and thus wear longer than lug 31.

In either form of the invention I may provide the driving member 14 with an inclined surface 43 over which the projections may ride to facilitate seating of the same in the recess 21.

The clutch can thus be moved to driving engagement only once in every two relative revolutions of the fixed and driving members. The clutch as shown and described is of rigid and substantial construction and has been found particularly well adapted for use wherever a clutch having such periodic engagement is desired.

Having thus described my invention and the advantages thereof, I do not wish to be limited to the details herein disclosed otherwise than as set forth in the claims, but what I claim is:—

1. A clutch having, in combination, a shaft to be driven, a member fixed to said shaft and having a peripheral recess therein, a driving member loose on said shaft and having a corresponding peripheral recess, a third member manually slidable on said shaft and having a projection slidable in said recesses to connect said driving member to said fixed member, said projection having an inner lug, a ring mounted in the upper face of said driving member and forming a shoulder for said lug, said ring having two peripheral recesses therein on opposite sides thereof to receive said lug, and means to turn said ring relative to said fixed and driving members.

2. A clutch having, in combination, a shaft to be driven, a member fixed to said shaft and having a peripheral recess therein, a driving member loose on said shaft and having a corresponding peripheral recess, a third member manually slidable on said shaft and having a projection slidable in said recesses to connect said driving member to said fixed member, said projection having an inner lug, a ring mounted in the upper face of said driving member and forming a shoulder for said lug, said ring having two recesses therein on opposite sides thereof to receive said lug, and means to turn said ring relative to said fixed and driving members, said means causing alignment of said lug with one of said recesses once only in every two relative revolutions of said fixed and driving members.

3. A clutch having, in combination, a shaft to be driven, a member fixed to said shaft and having a peripheral recess therein, a driving member loose on said shaft and having a corresponding peripheral recess, a third member manually slidable on said shaft and having a projection slidable in said recesses to connect said driving member to said fixed member, said projection having an inner lug, a ring mounted in the upper face of said driving member and forming a shoulder for said lug, said ring having two recesses therein on opposite sides thereof to receive said lug and having a series of internal gear teeth, and said fixed member having a smaller series of external gear teeth meshing therewith, whereby said lug is aligned with one of said recesses after a predetermined number of relative revolutions of said fixed and driving members.

4. A clutch having, in combination, a shaft to be driven, a member fixed to said shaft and having a peripheral recess therein, a driving member loose on said shaft and having a corresponding peripheral recess, a third member manually slidable on said shaft and having a projection slidable in said recesses to connect said driving member to said fixed member, said projection having an inner lug and said driving member having an inclined portion leading to the recess therein to guide said projection to said recess, a ring mounted in the upper face of said driving member and forming a shoulder for said lug, said ring having two peripheral recesses therein on opposite sides thereof to receive said lug, and means to turn said ring relative to said fixed and driving members.

In testimony whereof I have hereunto affixed my signature.

ALBERT A. GORDON.